W. H. Humphrey,
Molasses Gate.
No. 67,056.      Patented July 23, 1867.
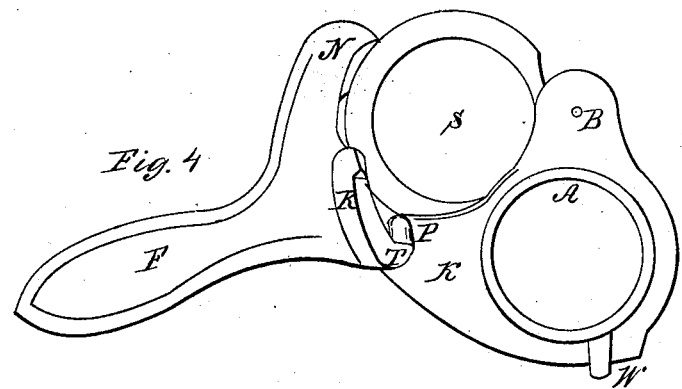
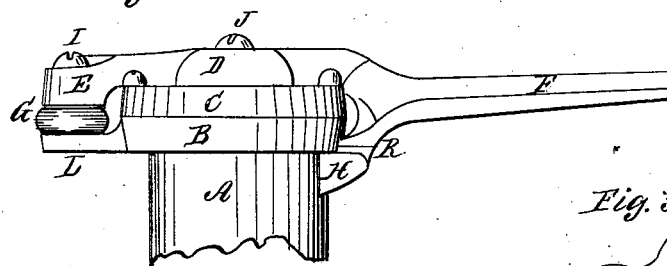
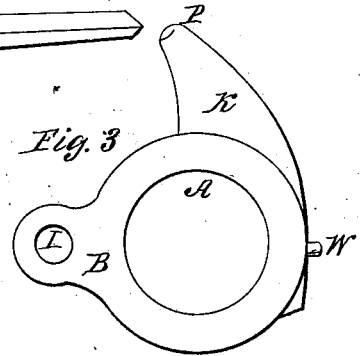
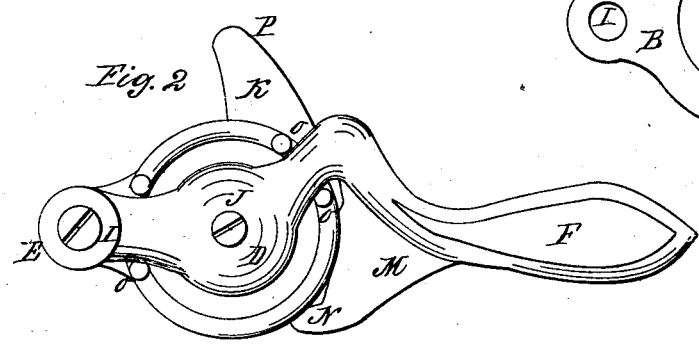
Witnesses:
Charles H. Kellum
R. W. Reill.
Inventor:
Wm H. Humphrey

United States Patent Office.

WILLIAM H. HUMPHREY, OF LANSINGBURG, NEW YORK.

Letters Patent No. 67,056, dated July 23, 1867.

IMPROVEMENT IN FAUCETS.

The Schedule referred to in these Letters Patent and making part of the same.

TO ALL WHOM IT MAY CONCERN:

Be it known that I, WILLIAM H. HUMPHREY, of Lansingburg, in the county of Rensselaer, and State of New York, have invented certain new and useful improvements in "Faucets;" and I do hereby declare that the following is a full, clear, and exact description of my said invention, reference being had to the accompanying drawings which form and make a part of this specification.

Like letters represent and refer to like or corresponding parts.

My invention relates to that species of faucet which is opened and closed by means of a gate. The superior convenience of these faucets over those operated by a screw has brought them into extensive use, but those hitherto made have been subject to one great defect, that of becoming loose and breaking after being used for any length of time. The object of my invention is to obviate this defect. It consists in the employment of a thick ring-packing of rubber or other elastic material surrounding the pivot on which the gate turns, in such a manner that the gate can be tightened when worn by use; also in the employment of a gate made in two parts, consisting of a disk and lever-handle, with an elastic packing between them, together with a wedge-shaped slide, by means of which the gate when closed is made to fit more closely to the mouth of the faucet, and also with stops which check the raising and lowering of the gate at the proper points, all being arranged and combined in the manner hereinafter described and set forth.

To enable others skilled in the art to which my invention relates to make and use the same, I will here proceed to describe the construction and operation of the same, which is as follows, to wit:

Figures 1, 2, 3, and 4, in the accompanying drawings, represent a faucet containing my said improvements, and clearly showing the construction and operation of the various parts thereof, substantially as hereinafter described and set forth.

A, figs. 1 and 3, represents the body of an ordinary faucet. B, same figures, is an annular projection surrounding the aperture of the faucet, and to which the slide K is attached. The gate of the faucet is constructed in two parts, the disk $c$ and the lever-handle D F, which are firmly fastened together by a screw at J. For greater firmness and strength the handle D F is also confined at the edges of the said disk by the projections $o$ $o$. I make the disk $c$ detached for the purpose of inserting between the same and the handle a packing of rubber or other elastic material, which yields slightly as the gate is brought down along the wedge-shaped slide K, and aids in tightly closing the faucet and preventing leakage. The said gate is also constructed with a projection, M N, figs. 2 and 4, which rests firmly on the slide K, figs. 1, 3, and 4. On the back of this projection are the shoulders R and T, fig. 4. The slide K is constructed in a tapering or wedge-shaped form, with the thinnest part at P', and gradually increasing in thickness down to W, figs. 3 and 4. P, fig. 4, is a stop on the top of the slide K, against which the shoulder T strikes when the gate is raised. W, figs. 3 and 4, is a stop or projection on the faucet, against which the shoulder R, fig. 4, strikes when the gate is lowered. Thus, in opening or closing the faucet, the movement of the gate is checked at the proper points. The gate is fastened at E to the projection L by a screw, I. Around the said screw, and between the gate and faucet, at their point of junction, I place the rubber ring or packing G, which serves to hold the gate steadily in its place. It will be seen that the gate can be easily raised, as the clasp or projection M N moves along the slide K, which grows thinner towards the top and permits entire freedom of motion. But on closing the gate the said projection or clasp, by reason of the greater thickness of the slide K at the bottom, brings the disk $c$ closely and firmly to the circle B, thus effectually preventing any leakage. When the gate becomes worn by use, so as to work more loosely, it is only necessary to tighten the screw I, which the yielding and elastic nature of the rubber packing G will allow to be done to the proper extent, and the gate will again fit tightly as before. The said screw, I, may be tightened in this manner as often as the gate may be loosened by use. The various parts of my said improved faucet may be made of cast iron or any other material deemed best, and of any size and strength required.

Having thus described the nature of my said invention and improvement, what I claim as my invention, and desire to secure by Letters Patent of the United States, is—

A faucet, consisting of the body A, slide K, with its stops, lever-handle D F, detachable disk $c$, spring G, and projection M N, with its stops, all constructed and arranged as hereinbefore specified and described.

In testimony whereof I have hereunto set my hand this 27th day of December, A. D. 1866.

WM. H. HUMPHREY.

Witnesses:
CHARLES D. KELLUM,
E. COWEN.